(12) United States Patent
Lambert et al.

(10) Patent No.: US 12,174,772 B2
(45) Date of Patent: Dec. 24, 2024

(54) SYSTEM AND METHOD FOR CONNECTING DEVICES HAVING VARIABLE FORM FACTORS TO DATA PROCESSING SYSTEMS

(71) Applicant: Dell Products L.P., Round Rock, TX (US)

(72) Inventors: Timothy M. Lambert, Austin, TX (US); Corey Dean Hartman, Hutto, TX (US); Jeffrey Leighton Kennedy, Austin, TX (US); William Andrew Smith, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/159,933

(22) Filed: Jan. 26, 2023

(65) Prior Publication Data

US 2024/0256480 A1    Aug. 1, 2024

(51) Int. Cl.
*G06F 13/40* (2006.01)

(52) U.S. Cl.
CPC .. *G06F 13/4063* (2013.01); *G06F 2213/0026* (2013.01)

(58) Field of Classification Search
CPC .............. G06F 13/4063; G06F 2213/0026
USPC ......... 710/2, 8, 14, 16, 31, 36, 62, 301, 305
See application file for complete search history.

(56) References Cited

U.S. PATENT DOCUMENTS

| | | | |
|---|---|---|---|
| 5,630,174 A * | 5/1997 | Stone, III | G06F 13/385 710/63 |
| 5,926,378 A * | 7/1999 | DeWitt | H05K 1/14 710/301 |
| 7,308,705 B2 | 12/2007 | Gordy et al. | |
| 7,970,279 B2 | 6/2011 | Dress | |
| 9,331,899 B2 | 5/2016 | Christopher et al. | |
| 9,684,575 B2 | 6/2017 | Breakstone et al. | |
| 10,019,388 B2 | 7/2018 | Long et al. | |
| 10,261,561 B2 | 4/2019 | Chuang et al. | |
| 10,359,815 B1 * | 7/2019 | Lin | H01R 12/721 |
| 10,733,116 B2 | 8/2020 | Litichever et al. | |
| 11,029,742 B2 | 6/2021 | Webel et al. | |
| 11,112,846 B2 | 9/2021 | Strach et al. | |
| 11,269,803 B1 * | 3/2022 | Chou | G06F 13/4068 |
| 2007/0156328 A1 * | 7/2007 | Nakamura | G01C 21/26 701/532 |

(Continued)

OTHER PUBLICATIONS

"DC-MHS R1 Overview," 2022 OCP Global Summit (56 Pages).

(Continued)

*Primary Examiner* — Idriss N Alrobaye
*Assistant Examiner* — Henry W Yu
(74) *Attorney, Agent, or Firm* — Womble Bond Dickinson (US) LLP

(57) ABSTRACT

Methods and systems for managing operation of data processing systems are disclosed. The data processing systems may include a limited number of hardware components. To increase the usable number or types of hardware components, an add-in card or other device may be attached to the data processing system. To facilitate connection of a variety of types of devices having varying form factors, an interposer may be used. The data processing system may modify a communication topology based on whether a device or the interposer is connected to it to establish communication channels.

20 Claims, 11 Drawing Sheets

(56) References Cited

U.S. PATENT DOCUMENTS

| | | |
|---|---|---|
| 2008/0126629 A1 | 5/2008 | Huang |
| 2009/0300329 A1 | 12/2009 | Naffziger et al. |
| 2015/0134868 A1* | 5/2015 | Shaeffer .............. G06F 13/4063 |
| | | 710/300 |
| 2017/0147052 A1 | 5/2017 | Waters et al. |
| 2022/0130432 A1 | 4/2022 | Jayapal et al. |
| 2022/0138387 A1* | 5/2022 | Narayanun ........... G06F 30/394 |
| | | 716/103 |

OTHER PUBLICATIONS

Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

\* cited by examiner

SYSTEM AND METHOD FOR CONNECTING DEVICES HAVING VARIABLE FORM FACTORS TO DATA PROCESSING SYSTEMS

FIELD

Embodiments disclosed herein relate generally to operation management. More particularly, embodiments disclosed herein relate to systems and methods to manage conditions impacting power supplies for data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
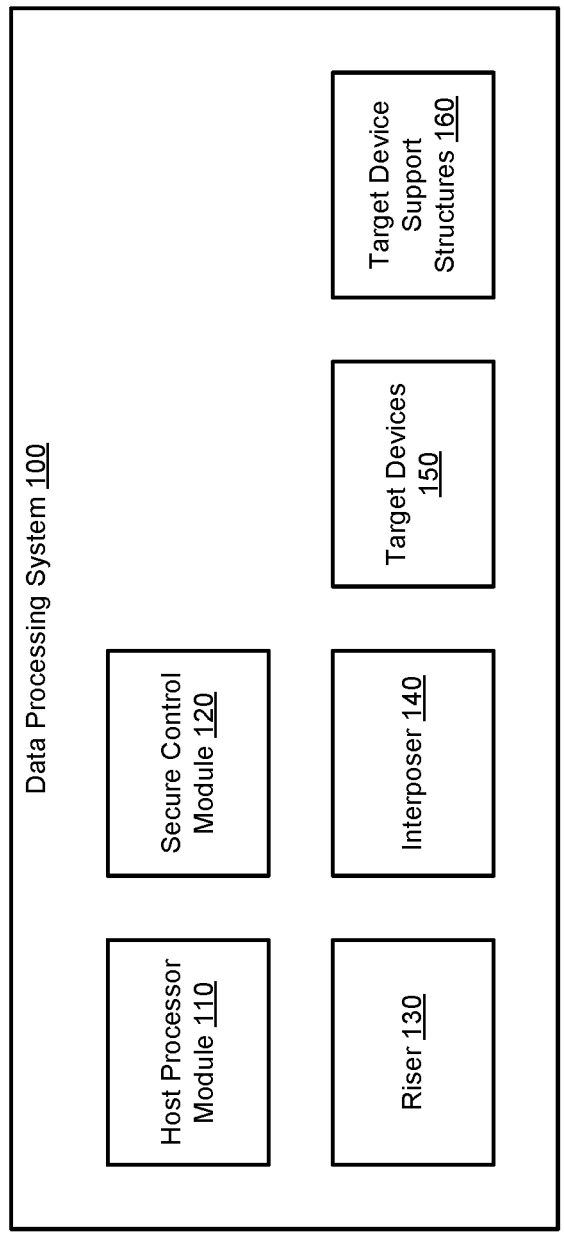
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services. To provide computer implemented services, a data processing system may include any number of hardware components. Due to the finite number of hardware components, the data processing system may have certain limits with its ability to provide the computer implemented services.

To provide flexibility, various add-in cards or other devices may be selectively operably connected to the data processing systems. These devices may expand the type and quantity of hardware components usable to provide the computer implemented services. Consequently, more or different types of computer implemented services may be provided.

To address varying form factors of devices which may be connected to the data processing system, an interposer and discovery process may be used. The interposer may facilitate connection of devices having a range of form factors to the data processing system.

During the discovery process, the data processing system may identify the type of device. Based on the type of the device, the data processing system may modify the connectivity of the riser to establish both data and management connections with the attached device. By doing so, point-to-point connections between hardware components may be used to manage communications, rather than relaying communications through multiple point-to-point connection. Consequently, the disclosed data processing system may have improved compatibility with devices of varying form factors.

In an embodiment, a method for managing operation of a data processing system is provided. The method may include identifying an occurrence of an attachment of a device to a riser of the data processing system; in response to the occurrence: performing a discovery process for the device to obtain a data package; making a determination, based on the data package, regarding whether the device is an interposer; in an instance of the determination where the device is the interposer: reconfiguring a bus between a processor of the data processing system and the interposer to exclude a first controller of the riser to obtain an updated bus, the updated bus operably connecting the processor and a second controller of the interposer; exchanging communications between the processor and a second device connected to the interposer using the updated bus; and providing computer implemented services using the communications.

The processor and the first controller may be operably connected via a first point-to-point link and the first controller and second controller may be operably connected via a second point-to-point link while the interposer may be connected to the interposer using a slot of the riser that conforms to a first standard.

The second device may be operably connected to the second controller while the second device is connected to a slot of the interposer that conforms to a second standard, the first standard and the second standard being different standards.

The slot of the riser may be Peripheral Component Interconnect Express (PCIe) compliant, and the slot of the interposer may be Enterprise and Data Center Standard Form Factor (EDFSS) compliant.

The slot may include a type 1C connector. A type 1C connector may be a form factor for a connector specified by the EDFSS E1, E2, or other standard. The connector may be smaller than a PCIe slot, or may otherwise not be connected to a PCIe slot successfully.

The device may be EDFSS E1 compliant, EDFSS E2 compliant, or Open Computer Project Network Interface Card 3.0 (OPCNIC3.0) compliant.

Reconfiguring the bus may include instructing, by a management controller of the data processing system and using a second bus, the first controller to active a bypass around the first controller that forwards data between the first point-to-point link and the second point-to-point link; activating, by the first controller and responsive to being instructed by the management controller, the bypass; and while the bypass is activated, snooping, by the first controller, the communications.

The first point-to-point link may be Modular Peripheral Sideband Tunnelling Interface (M-PESTI) compliant.

Exchanging the communications between the processor and a second device connected to the interposer using the updated bus may include performing, by a logic device of a host processor module of the data processing system, a second discovery process using the updated bus to identify the second controller; and responsive to identifying the second controller, obtaining, by the logic device, a second data package from the second controller, the second data package indicating presence of the second device.

The processor may be hosted by the host processor module, the host processor module is directly connected to the riser, and the host processor module is directly connected to a secure control module that hosts the management controller.

In an embodiment, a non-transitory media is provided. The non-transitory media may include instructions that when executed by a processor cause the method to be performed.

In an embodiment, a data processing system is provided. The data processing system may include the non-transitory media, and a hardware device, and may perform the method when the computer instructions are executed by the hardware device.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown).

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

For example, data processing system 100 may include a host processor module 110 which may include a processor, memory modules, and/or other components. These hardware components may provide processing functionality. Data processing system 100 may include any number and types of hardware components.

The ability of data processing system 100 to provide computer implemented services may be limited by the types and quantity of hardware components available to it. For example, the quantities and types of processors of data processing system 100 may limit how quickly information may be processed by data processing system 100, the number and types of memory modules of data processing system 100 may limit how much information may be temporarily stored for use in processing by data processing system 100, etc.

In general, embodiments disclosed herein may provide methods, systems, and/or devices for providing computer implemented services. To provide the computer implemented services, data processing system 100 may include functionality to reversibly add various hardware components to itself. By doing so, the rate at which the computer implemented services may be provided, the types of computer implemented services may be provided, and/or other aspects regarding the capability of data processing system 100 to provide computer implemented services may be provided.

To provide the above noted functionality, data processing system 100 may include secure control module 120, riser 130, interposer 140, target devices 150, and target device support structures 160. Each of these components is discussed below.

Like host processor module 110, secure control module 120 may be implemented using a modularized portion of hardware components (e.g., a circuit card with connectors to facilitate interconnection of the circuit card to other modules, and hardware components positioned on the circuit card). In contrast to host processor module 110 which may provide information processing functionality, secure control module 120 may provide management functionality. For example, secure control module 120 may include functionality to (i) identify changes in available hardware components (e.g., such as attachment/detachment of target devices 150, discussed below), and (ii) based on the changes, modify the operation of data processing system 100 to utilize the changes in the available hardware components.

Riser 130 may facilitate connection of various components to host processor module 110. Riser 130 may be implemented using, for example, a structure (e.g., a cage), an electrical interconnection (e.g., communication interfaces including slots/ports/plugs/receptacles/etc.), and/or one or more management components such as controllers, multiplexers, etc. The management components may cooperate with secure control module 120 to configure the internal connectivity of data processing system 100 to facilitate operable connection of various target devices to host processor module 110.

Interposer 140 may facilitate connection of various types of target devices 150 that may conform to different standards/specifications to riser 130. For example, riser 130 may include a port (e.g., a Peripheral Component Interconnect Express (PCIe) slot) to which target devices or interposer 140 may connect. However, because different target devices 150 may conform to different standards, all of target devices 150 may not be able to connect to the port of riser 130. Interposer 140 may facilitate interconnection of target devices 150 that cannot be directly connected to the port of riser 130 via itself. Interposer 140 may be implemented using, for example, an electrical interconnection (e.g., communication interfaces including slots/ports/plugs/receptacles/etc. to connect the port of riser 130 to plugs/receptacles of target devices 150), and/or one or more management components such as controllers, multiplexers, etc. The management components may cooperate with secure control module 120 to configure the internal connectivity of data processing system 100, (e.g., of riser 130 and interposer 140) to facilitate operable connection of various target devices 150 to host processor module 110.

Target devices 150 may include one or more hardware components which may be utilized by host processor module 110 to provide computer implemented services. Target devices 150 may implemented using, for example, hardware components positioned on a circuit board, and one or more ports which may be connected to the corresponding port of riser 130 or interposer 140, depending on whether the riser 130 and target devices 150 comply with similar or different specifications. For example, as noted above, riser 130 may be implemented with a port that complies with the PCIe specification. Any of target devices 150 may be implemented with ports that also comply with the PCIe specification, or other specifications such as the Enterprise and Data Center Standard Form Factor (EDFSS). Interposer 140 may include two ports that comply with the respective standards implemented by riser 130 and target devices 150.

Target device support structures 160 may physically support target devices 150 while target devices 150 are operably connected to host processor module 110. Like the ports of target devices 150, the form factor of target devices 150 may also comply to various form factors such as the PCIe, EDFSS E1, EDFSS E2, or Open Computer Project Network Interface Card 3.0 (OPCNIC3.0) specification. Target device support structures 160 may include inserts or other structures for a standardized holder that may adapt the holder to the specific form factors implemented by target devices 150. For example, the standardized holder may be a tray or other structure that conforms to the PCIe specification. Target device support structures 160 may include adapters (e.g., inserts) that allow the standardized tray to also physically support (e.g., position/orient) target devices 150 of varying form factors.

Figure 3:
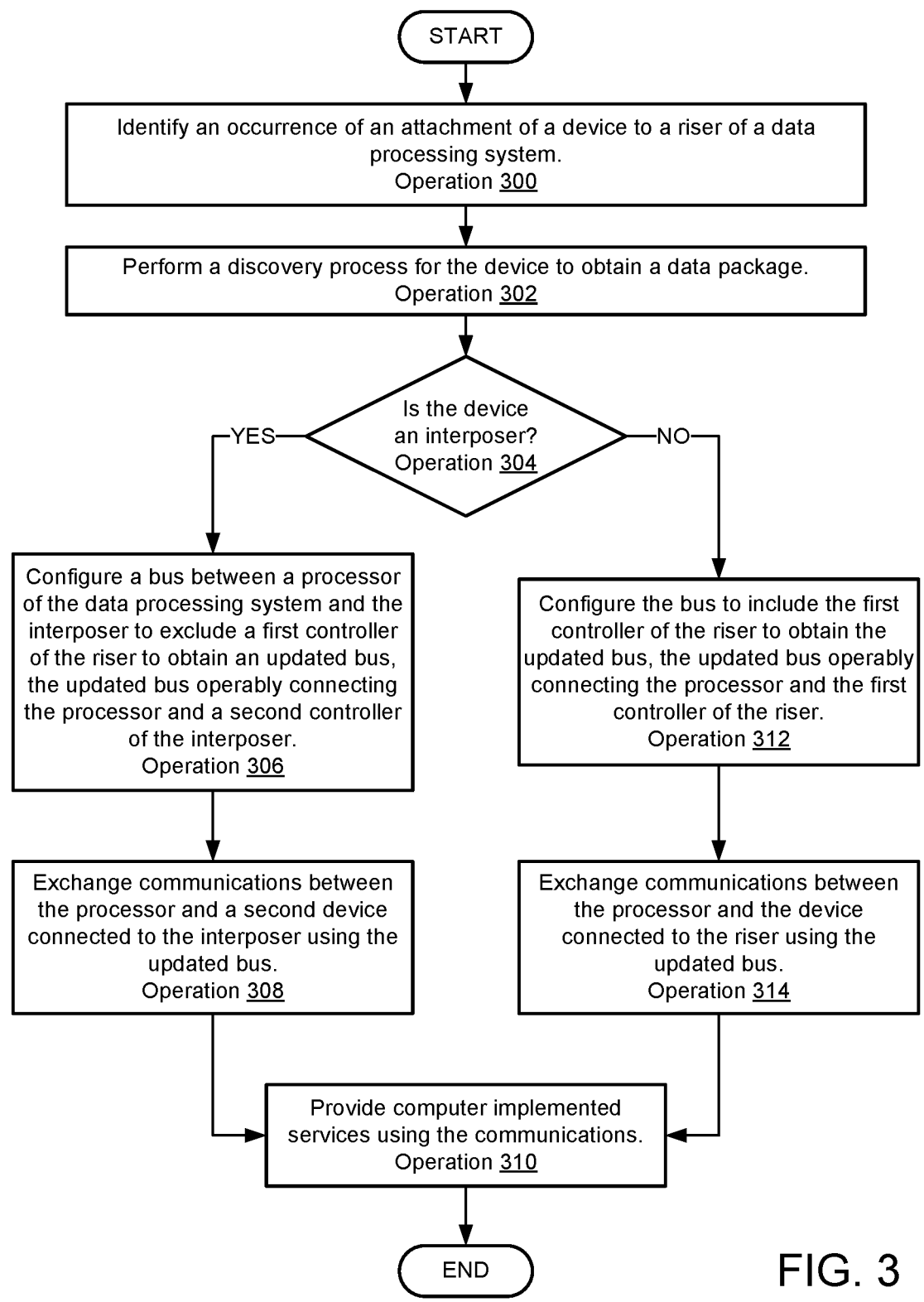
FIG. 3 shows a flow diagram illustrating a method of managing the operation of data processing systems in accordance with an embodiment.

When providing its functionality, data processing system 100, or components thereof, may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those illustrated therein.

As discussed above, data processing system 100 may reconfigure its connectivity to facilitate operable connection to various target devices 150. FIGS. 2A-2H show connectivity topology diagrams illustrating connectivity between various components of data processing system 100 under different conditions. In FIGS. 2A-2H, communication channels that support data transmission are illustrated using solid lines terminating in arrows. In contrast, digital logic channels usable to reconfigure the internal connectivity of data processing system 100 are shown using dashed lines terminating in arrows. For example, a logic channel may allow a component to output a logic signal that may cause another component that receives the logic signal (e.g., high or low, binary logic) to modify its operation correspondingly.

Connections between various components of data processing system 100 are shown in FIGS. 2A-2H with various infill patterns. The connections may include a receptacle (e.g., slots) of one component and plugs (e.g., edge connectors) of another component. The plug and connector may each include any number of electrical contacts to establish communication channels between the components. Traces or other conductors may be attached to the plugs/receptacles thereby connecting various portions of two different components.

Figure 2A:
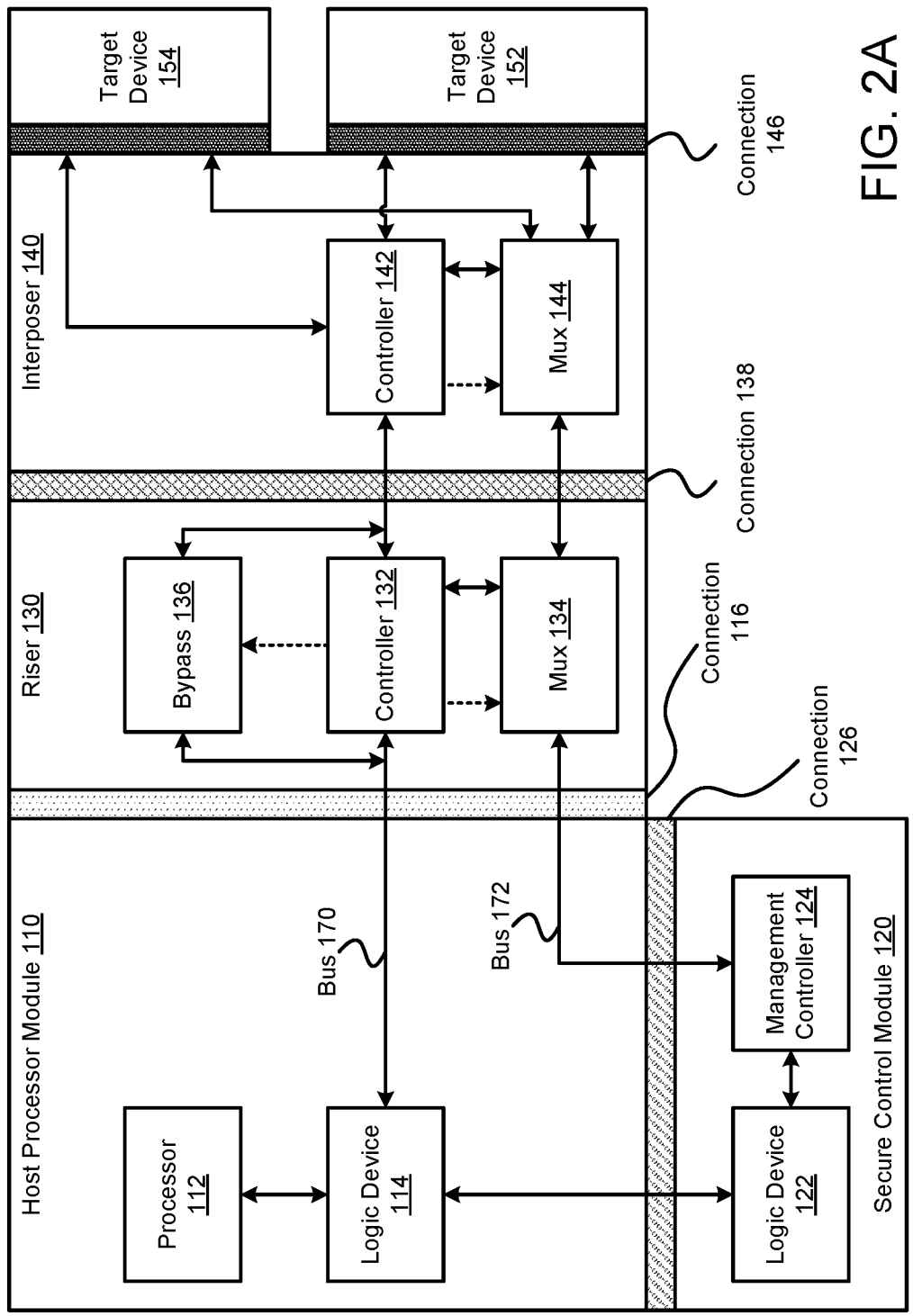
FIGS. 2A-2H show diagrams illustrating communication topologies in accordance with an embodiment.

Turning to FIG. 2A, a first connectivity diagram in accordance with an embodiment is shown.

To provide computer implemented services, host processor module 110 may include processor 112. To operably connect processor 112 to other components, host processor module 110 may include logic device 114. Logic device may be implemented using, for example, a field programmable gate array or other type of logic device. Logic device 114 may be operably connected to other components thereby allowing processor 112 to communicate with these other components.

For example, logic device 114 may be connected to bus 170 which may connect to connection 116. Bus 170 may allow processor 112 to communicate with devices connected to connection 116. Connection 116 may comply with any communication/form factor specification, such as the Modular-Extensible IO (M-XIO) Base (M-XIO) specification.

To provide communication functionality, riser 130 may include controller 132, multiplexer (mux) 134, and bypass 136). These components may facilitate (i) communications between processor 112 and devices connected to riser 130, and (ii) configuration of the communication topology of riser 130 depending on which type of device is connected to riser 130. In FIG. 2A, riser 130 is illustrated as being connected to interposer 140. However, riser 130 may be connected to a target device directly rather than via interposer 140. Refer to FIG. 2H for additional details regarding connection of riser 130 directly to a target device.

Controller 132 may be implemented with a microcontroller or other type of programmable device. Controller 132 may include functionality (e.g., by being programmed to perform these functionalities) to (i) identify downstream devices connected to it (e.g., either interposer 140 or a target device), (ii) provide information regarding the downstream devices to other devices such as management controller 124, (iii) modify the operating state of bypass 136 to either forward communications around controller 132 (e.g., thereby allowing communications from logic device 114 to reach controller 142 via bypass 136 rather than via controller 132), (iv) modify the operating state of mux 134 to place management controller 124 in operable communication with mux 144 or controller 132, and (v) enter a snooping mode (e.g., when bypass 136 is active and mux 134 is directing communications to mux 144) in which controller 132 monitors bus 170 for communications to identify whether downstream devices have been detached from or attached to riser 130 (which may allow controller 132 to return to an active state to facilitate component discovery/management/etc.).

Mux 134 may be implemented using a multiplexer with a selection input connected to controller 132 thereby allowing controller 132 to selectively direct communications on bus 172 to mux 144 or controller 132. Mux 134 may be implemented using a discrete component (e.g., a chip) or integrated with other components (e.g., controller 132).

Bypass 136 may, as noted above, bypass communications around controller 132. For example, bypass 136 may be implemented with a chip that forwards communications on bus 170 when instructed to do so by controller 132. Bypass 136 may include an enable input connected to controller 132 thereby allowing controller 132 to selectively control when bypass 136 is active or inactive (e.g., not forwarding communications of bus 170 around controller 132).

Riser 130 may be operably connected to interposer 140 or a target device via connection 138. Connection 138 may be implemented using, for example, a slot (e.g., of riser 130) and a plug (e.g., of interposer 140 or a target device) compliant with the PCIe standard, or another form factor standard.

To provide communication and/or adaptation functionality, interposer 140 may include controller 142, mux 144, and various instances of connection 146). These components may facilitate (i) communications between processor 112 and devices connected to interposer 140, and (ii) configuration of the communication topology of interposer 140 depending on which devices are connected to interposer 140.

Controller 142 may be implemented with a microcontroller or other type of programmable device. Controller 142 may include functionality (e.g., by being programmed to perform these functionalities) to (i) identify downstream devices connected to interposer 140 via one or more instances of connection 146 (e.g., one or more target devices), (ii) provide information regarding the downstream devices to other devices such as management controller 124, (iii) modify the operating state of mux 144 to place management controller 124 in operable communication with target devices (e.g., 152, 154) or controller 142, and (v) facilitate communications between logic device 114 and target devices (e.g., 152, 154) through forwarding of communications.

Mux 144 may be implemented using a multiplexer with a selection input connected to controller 142 thereby allowing controller 142 to selectively direct communications on bus 172 to target devices (e.g., 152, 154) or controller 142. Mux 144 may be implemented using a discrete component (e.g., a chip) or integrated with other components (e.g., controller 142).

Interposer 140 may be operably connected to target devices (e.g., 152, 154) via any number of instances of connection 146. An instance of connection 146 may be implemented using, for example, a slot (e.g., of interposer 140) and a plug (e.g., of a target device) compliant with any of the EDFSS specifications or the OPCNIC3.0 specification. Different instances of connection 146 may conform to different specifications.

Target devices 152-154 may be implemented using form factor compliant (e.g., EDFSS E1, E3, etc.) devices. For example, target devices 152-154 may be implemented using circuit cards, hardware components positioned on the circuit cards, plugs or other types of hardware for establishing instances of connection 146, etc. By virtue of the form factors of target devices 152-154, various adapters or inserts may be used to mechanically support target devices 152-154 while connected to interposer 140.

Thus, while connected to interposer 140, any of target devices 152-154 may communicate with processor 112 via bus 170 (e.g., links between logic device 114, controller 132, controller 142, and the target devices). For example, bus 170 may be implemented with point-to-point communication links that comply with the Modular Peripheral Sideband Tunnelling Interface (M-PESTI) specification.

To manage the connectivity provided by these links, secure control module 120 may include management controller 124 and logic device 122. Logic device 122 may be similar to logic device 114.

Management controller 124 may be implemented using an in-band or out-of-band management controller. Management controller 124 may be implemented using a system on a chip, or other types of hardware components.

Management controller 124 may be operably connected to mux 134, mux 144, and target devices 152-154 via bus 172. Bus 172 may be implemented using a shared bus. The shared bus may be I2C compliant, or may comply with other communication protocols/specifications. Management controller 124 may also be connected to controller 132 and controller 142 via bus 170 (e.g., via the link to logic device 122 that may be connected to logic device 114).

Management controller 124 may obtain information regarding downstream devices (e.g., whether interposer 140 or a target device is directly connected to riser 130), and reconfigure the communication topology based on the presence of downstream devices. Refer to FIGS. 2A-2G for additional details regarding various communication topologies that may be present.

Secure control module 120 may be operably connected to host processor module 110 via connection 126.

To further clarify communication topologies, communication topology diagrams with certain links highlighted using thicker line weights are shown in FIGS. 2B-2G.

Figure 2B:
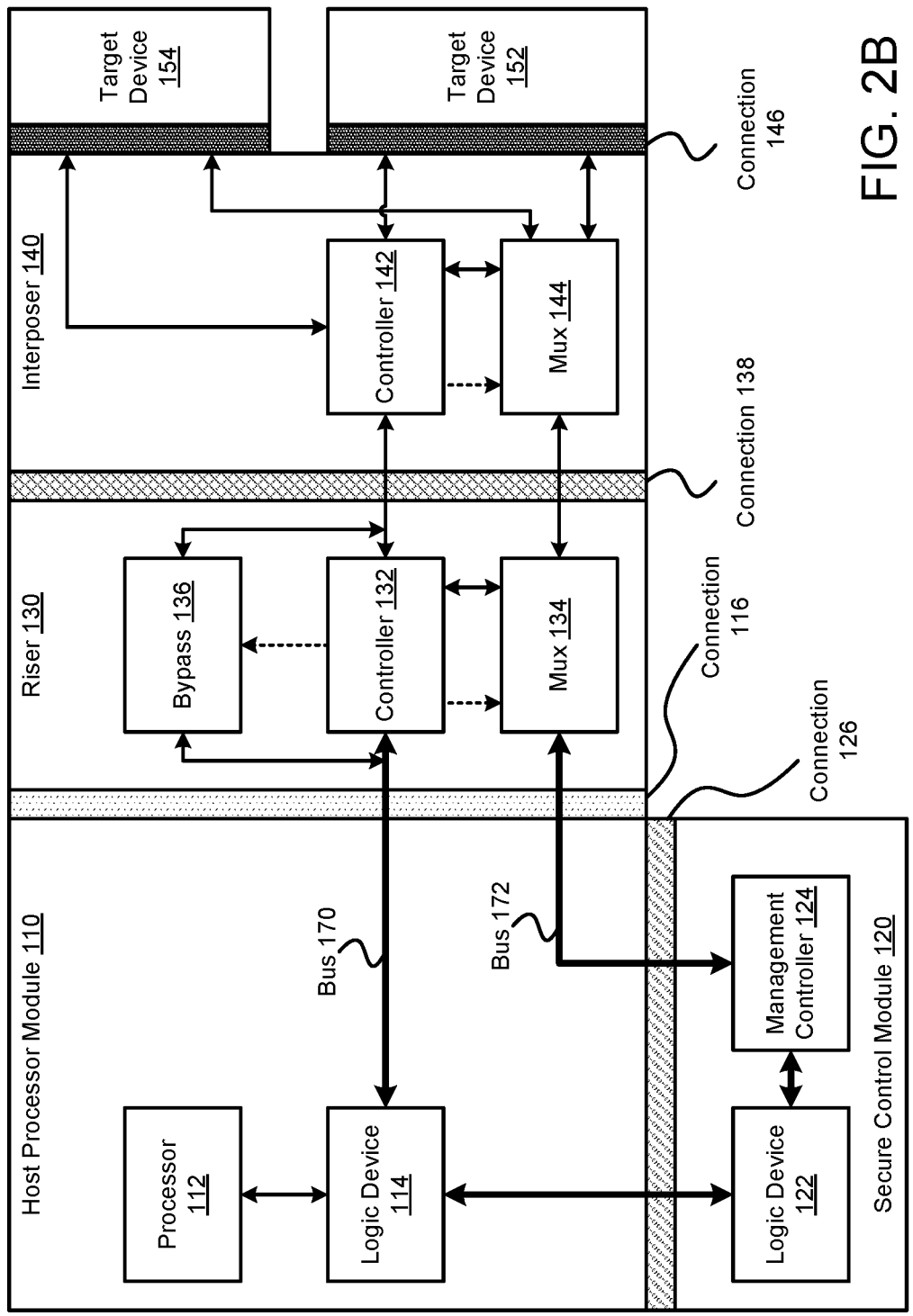

Turning to FIG. 2B, a second connectivity diagram in accordance with an embodiment is shown. The topology shown in FIG. 2B may be present when a device (either interposer or a target device) connects to riser 130 via connection 138.

Prior to connection, the connections between host processor module 110 and riser 130 may be active. When a device connects, controller 132 may notify management controller 124 that a device has been connected.

Figure 2C:
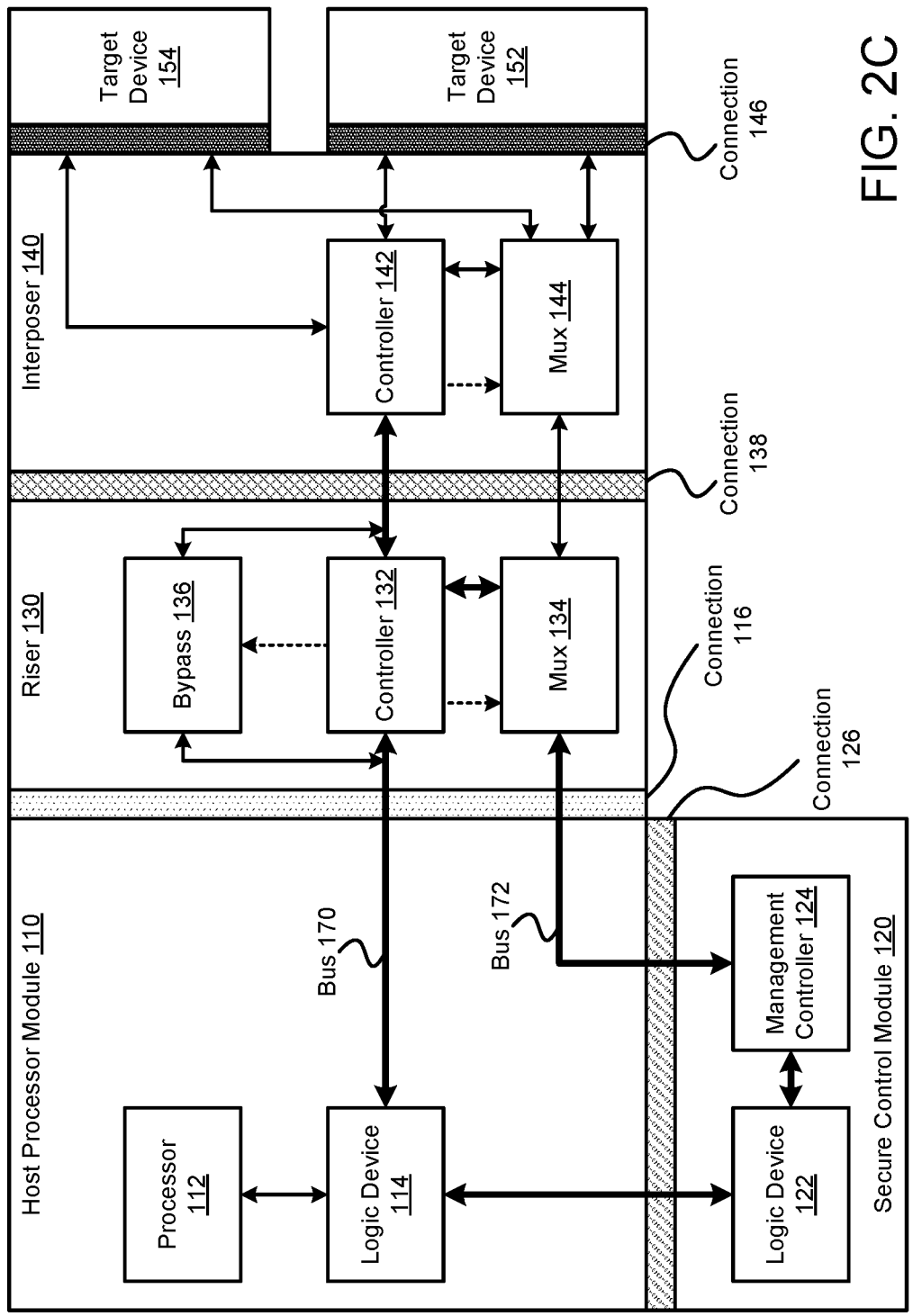

Turning to FIG. 2C, a third connectivity diagram in accordance with an embodiment is shown. The topology shown in FIG. 2C may be present after a device (either interposer or a target device) connects to riser 130 via connection 138 but prior to completion of discovery with respect to the device.

Responsive to the notification, management controller 124 may begin to communicate with controller 132 to prepare for discovery of the downstream device. During discovery, controller 132 may communicate with controller 142 to identify a type of the device. In this case, controller 132 may identify that the device is interposer 140. Controller 132 may notify management controller 124 of interposer 140 by providing a data package via bus 172. At this point, logic device 114 may not be aware of the presence of controller 142 or any device attached to riser 130.

Figure 2D:
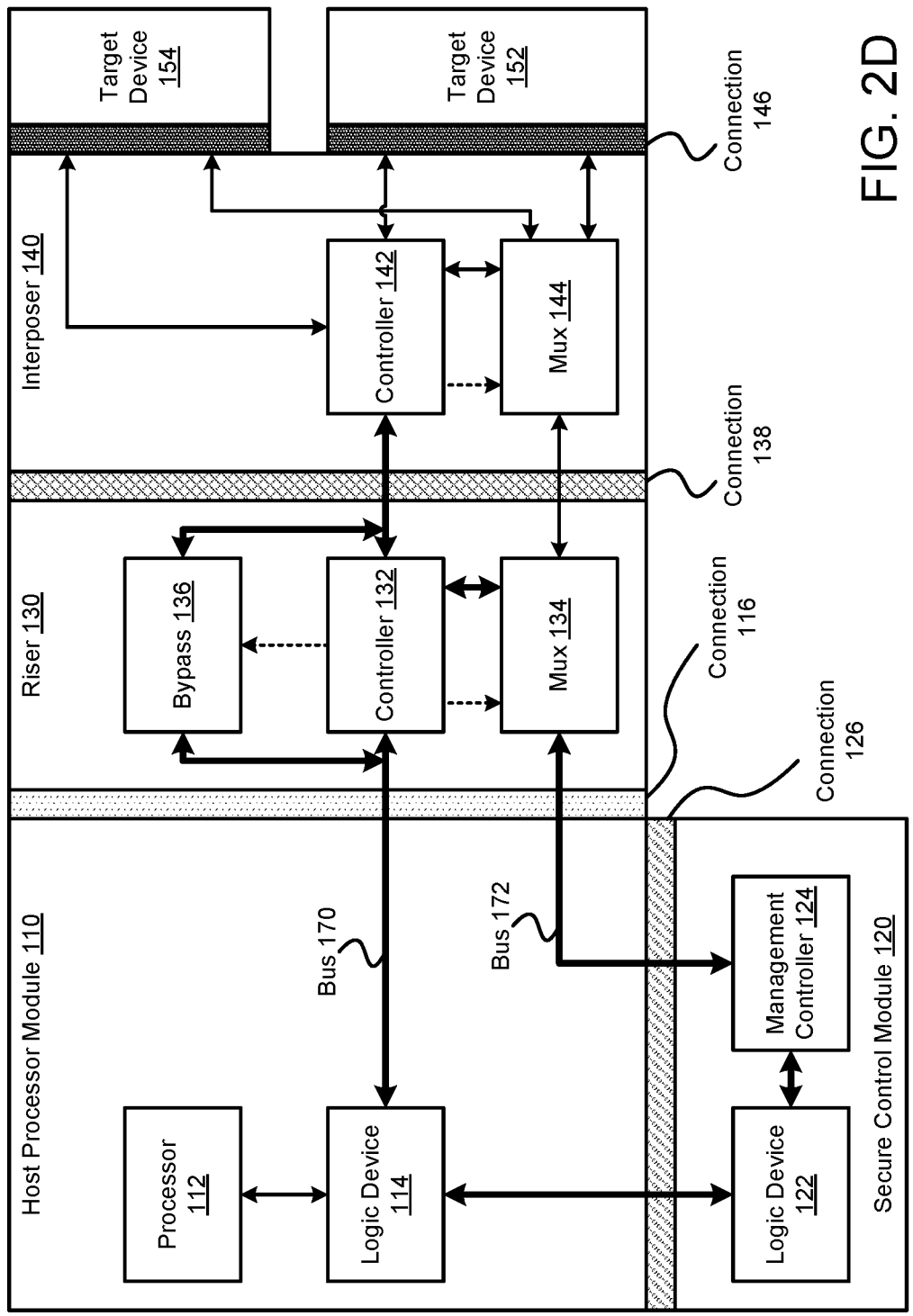

Turning to FIG. 2D, a fourth connectivity diagram in accordance with an embodiment is shown. The topology shown in FIG. 2D may be present after management controller 124 identifies that interposer 140 is present.

Based on the presence of interposer 140, management controller 124 may instruct, via bus 172, riser 130 to activate bypass 136 and enter snooping mode. Once bypass 136 is active and controller 132 is in snoop mode, logic device 114 may identify presence of controller 142.

Figure 2E:
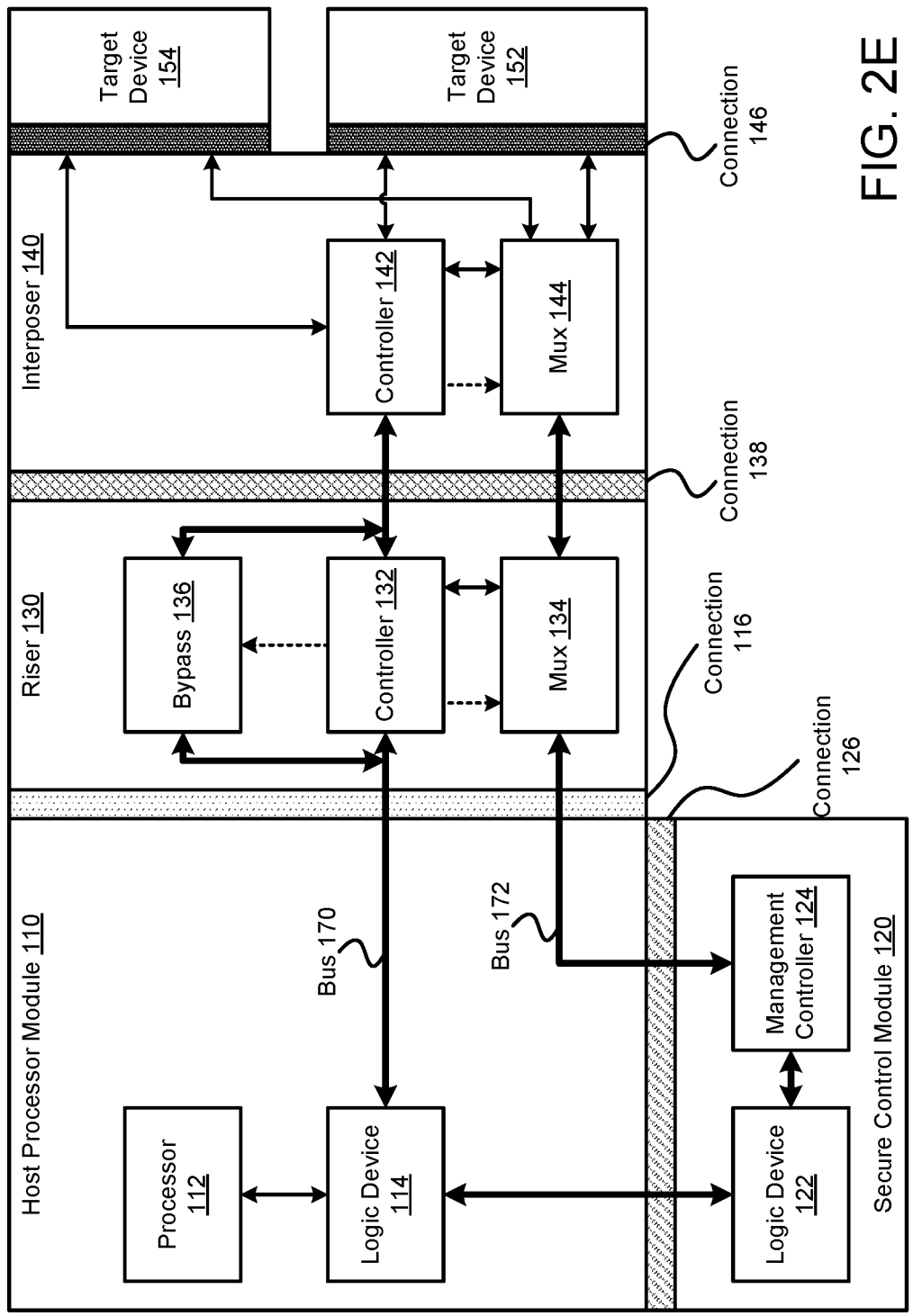

Turning to FIG. 2E, a fifth connectivity diagram in accordance with an embodiment is shown. The topology shown in FIG. 2E may be present after controller 142 is presented to logic device 114.

To facilitate management of riser 130, controller 132 may configure mux 134 to direct communications to mux 144 rather than controller. Consequently, bus 172 may operably connect management controller 124 to mux 144 rather than controller 132. Accordingly, management controller 124 may communicate with controller 142, target device 152, or target device 154 via mux 144.

Additionally, via bus 170, logic device 114 may discover controller 142. Consequently, as will be shown in FIGS.

2F-2G, logic device 114 and processor 112 may begin to communication with target device 152 and target device 154 via bus 170.

Figure 2F:
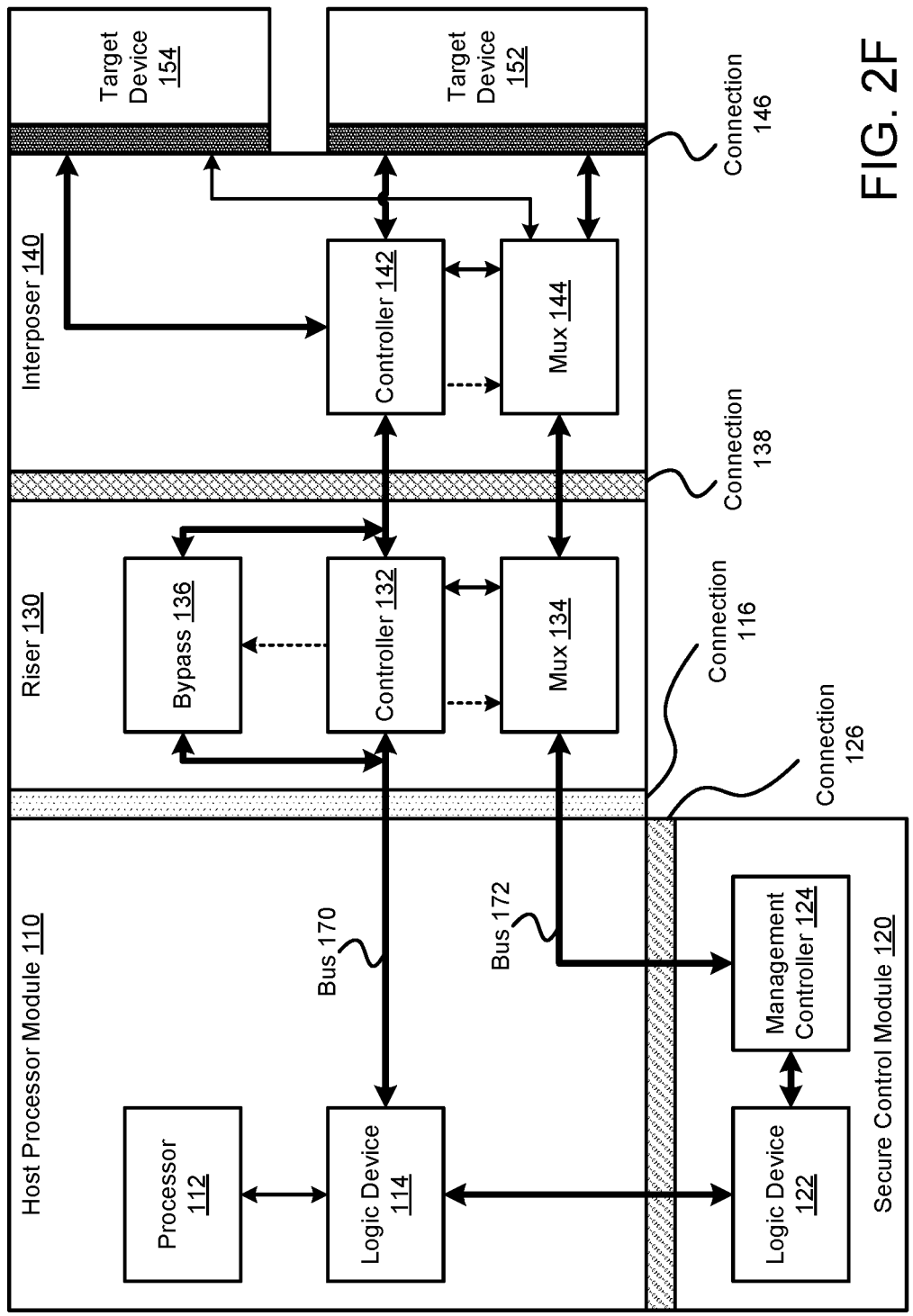
Figure 2G:
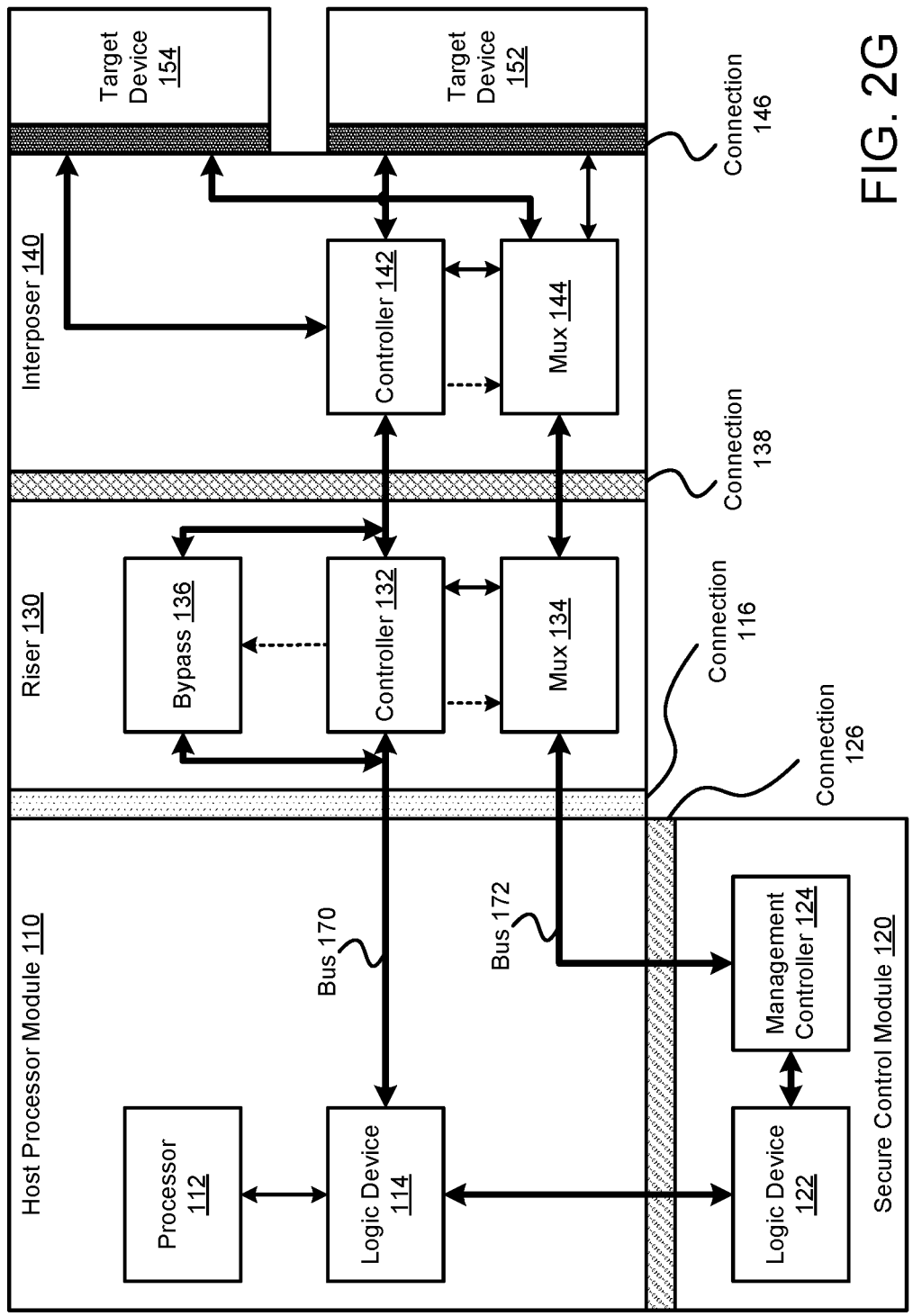
Figure 2H:
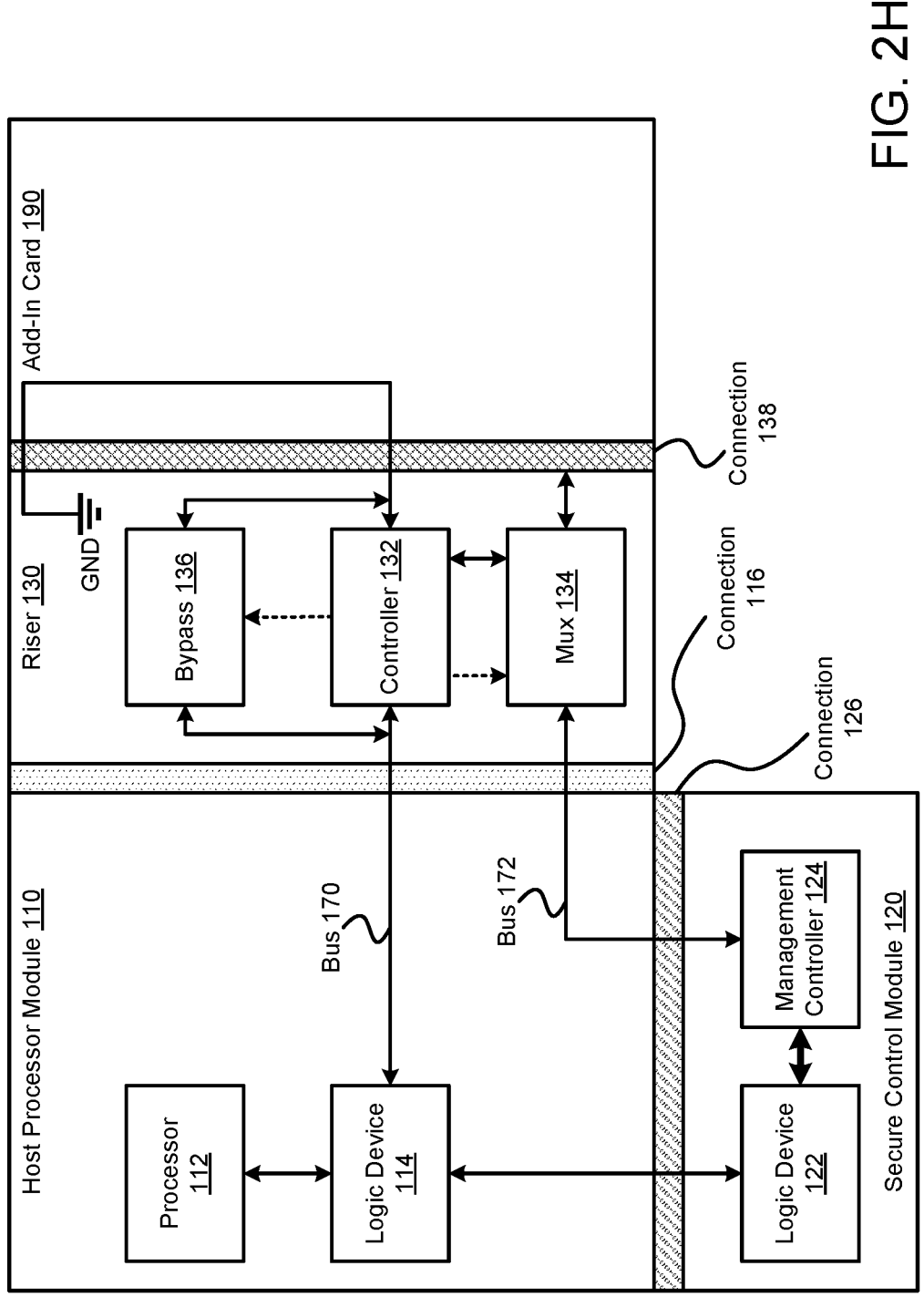

Turning to FIGS. 2F-2G, a fifth and six connectivity diagram, respectively, in accordance with an embodiment are shown. The topology shown in FIGS. 2F-2G may be present once discovery of controller 142 by logic device 114 is complete.

As seen in these figures, bus 170 may facilitate communication with target devices 152-154 via controller 142. Similarly, mux 144 may facilitate management of target devices 152-154 by selectively operably connecting management controller to them via bus 172. For example, by modifying the configuration of mux 144, either of these target device may be operably connected to bus 172 thereby allowing management controller 124 to (i) monitor their operation and (ii) managing their configuration/operations (e.g., through instructing target devices 152-154 to perform various actions.

Turning to FIG. 2H, an eight connectivity diagram in accordance with an embodiment is shown. In contrast to the diagrams illustrated in FIGS. 2A-2G, in FIG. 2H add-in card 190 (e.g., a target device) complies with the PCIe specification and is able to directly connect to riser 130. Consequently, in this example, bypass 136 may be maintained as being inactive, and controller 132 may facilitate communications between logic device 114 and the hardware components of add-in card 190.

Thus, when connected, controller 132 may discover add-in card 190, report its presence to management controller 124 which may instruct controller 132 to disable bypass 136 and configure mux 134 so that management controller 124 may communicate with add-in card 190 via bus 172. Controller 132, rather than entering snoop mode, may instead remain active and support bus 170 to facilitate communication between processor 112 and add-in card 190.

As discussed above, the components of FIG. 1 may perform various methods to provide computer implemented services by managing responses to changing conditions such as attachment of various devices to risers. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for manage operation of a data processing system in accordance with an embodiment is shown. The method may be performed by data processing system 100, management controller 124, controllers (e.g., 132, 142), and/or other components of the system shown in FIG. 1.

At operation 300, an occurrence of an attachment of a device to a riser of a data processing system is identified. The occurrence may be identified by (i) receiving a notification (e.g., from a controller of the riser) that the device has been attached, (ii) by identifying changes in electrical impedance or power draw indicative of an attachment, and/or via other methods.

At operation 302, a discovery process is performed to obtain a data package. The discovery process may include communicating with the device. The communications may indicate whether the device is an interposer. If the device is an interposer, a controller of the riser may send the data package to a management controller. The data package may indicate that the device is an interposer rather than a target device.

At operation 304, a determination is made regarding whether the device is an interposer. The determination may be made based on the data package, which may indicate the type of the device attached to the riser.

If the device is an interposer, the method may proceed to operation 306. Otherwise the method may proceed to operation 312.

At operation 306, a bus between a processor of the data processing system and the interposer is configured to exclude a first controller of the riser to obtain an updated bus. The updated bus may operably connect the processor and a second controller of the interposer.

The bus may be configured by instructing the first controller to (i) activate a bypass, (ii) configure a multiplexer to direct management communications to the interposer, and (iii) enter a snooping mode of operation. The first controller may follow the instructions thereby reconfiguring the connection topology to that described with respect to FIG. 2E.

At operation 308, communications between the processor and a second device connected to the interposer are exchanged using the updated bus. The communications may be exchanged by performing a discovery process with respect to the second controller, and using the second controller to communicate with the second device. The second device may be a target device connected to the interposer. For example, the communication topology described with respect to FIGS. 2F-2G may be in play allowing the processor to communicate with any number of target devices connected to interposer 140.

At operation 310, computer implemented services are provided using the communications. The computer implemented services may be provided, for example, by using the communications in computations performed to provide the computer implemented services. For example, various portions of the computer implemented services may be off-loaded to target devices, and results of the operation of the target devices may be used by the processor to provide the computer implemented services.

The method may end following operation 310.

Returning to operation 304, the method may proceed to operation 312 following operation 304 if the device is not an interposer (e.g., if it is a target device).

At operation 312, the bus is configured to include the first controller of the riser to obtain the updated bus. The updated bus may operably connect the processor and the first controller of the riser.

The bus may be configured by instructing the first controller to (i) deactivate the bypass (if active), (ii) configure the multiplexer to direct management communications to the device connected to the riser, and (iii) enter an active mode of operation where the first controller actively participates in communication (e.g., by acting as a M-PESTI target, in contrast operation 306 may hide the first controller as a M-PESTI target from a logic device between the processor and the first controller thereby preventing it from communicating with the first controller).

At operation 314, communications between the processor and the device connected to the riser are exchanged using the updated bus. The device may have already been discovered as a communication target (e.g., an M-PESTI target) for the first controller. For example, the communication topology described with respect to FIG. 2H may be present allowing the processor to communicate with the device via the first controller of the riser.

The method may proceed to operation 310 following operation 314, and may end following operation 310.

Using the method illustrated in FIG. 3, a data processing system may utilize hardware components of target devices of varying form factors. For example, by utilizing an interposer, the form factors and compatibilities of the target devices may not prevent formation of operable connections to risers of data processing system. Accordingly, a data processing system in accordance with an embodiment may be able to utilize a wider array of types of target devices.

Figure 4:
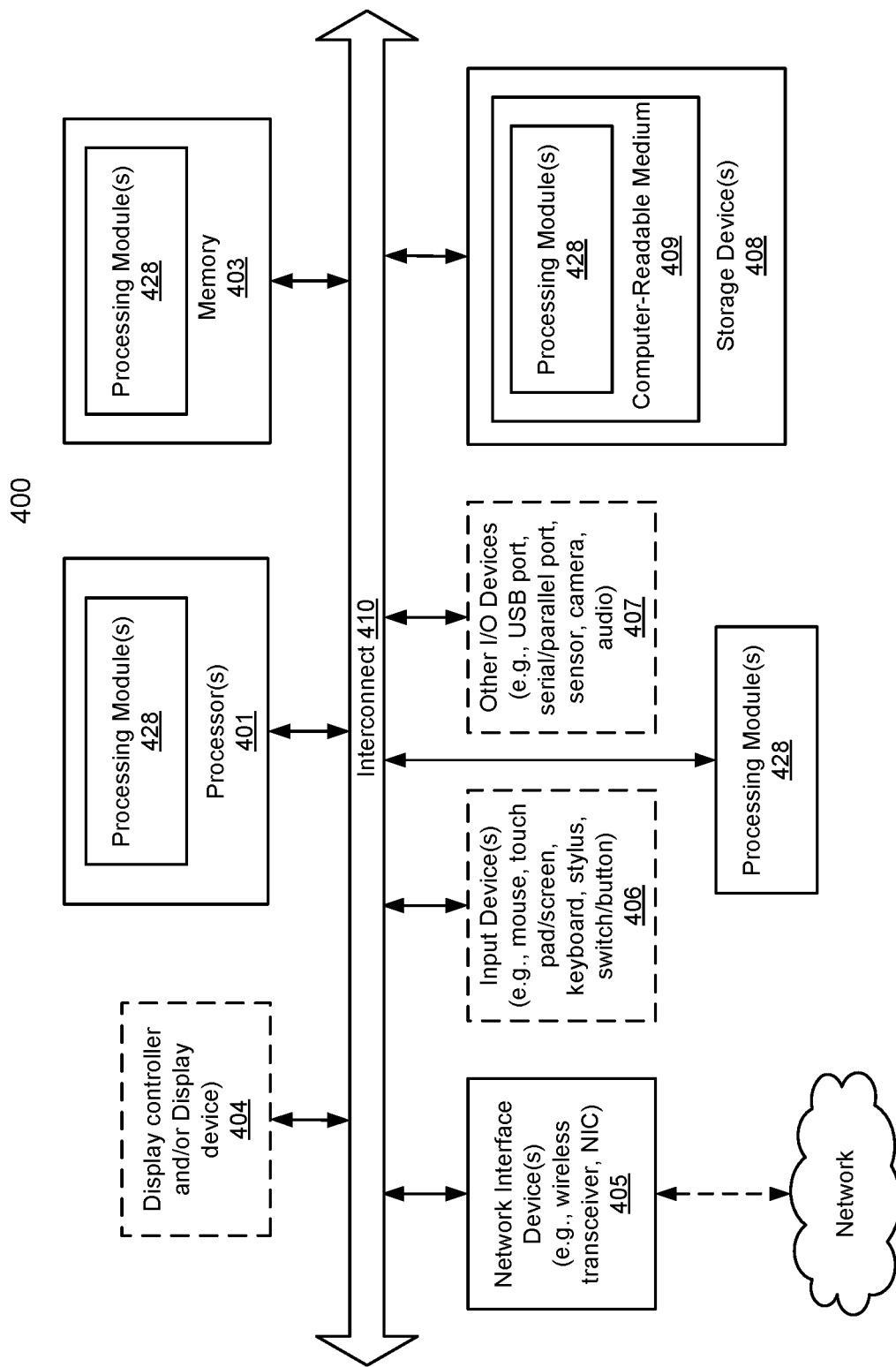
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In an embodiment, system 400 includes processor 401, memory 403, and devices 405-407 via a bus or an interconnect 410 (e.g., which may include M-PESTI and/or other types of communication links). Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OSR/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system having a management controller and a processor, the method being performed by the data processing system and comprising:

identifying, by the management controller, an occurrence of an attachment of a device to a riser of the data processing system;
in response to the occurrence:
performing, by the management controller, a discovery process for the device to obtain a data package;
making a determination, by the management controller and based on the data package, regarding whether the device is an interposer;
in an instance of the determination where the device is the interposer:
reconfiguring, by the management controller, a bus between the processor of the data processing system and the interposer to exclude a first controller of the riser to obtain an updated bus, the updated bus operably connecting the processor and a second controller of the interposer;
exchanging, by the processor, communications between the processor and a second device connected to the interposer using the updated bus; and
providing, by the processor, computer implemented services using the communications.

2. The method of claim 1, wherein the processor and the first controller are operably connected via a first point-to-point link and the first controller and second controller are operably connected via a second point-to-point link while the interposer is connected to the interposer using a slot of the riser that conforms to a first standard.

3. The method of claim 2, wherein the second device is operably connected to the second controller while the second device is connected to a slot of the interposer that conforms to a second standard, the first standard and the second standard being different standards.

4. The method of claim 3, wherein the slot of the riser is Peripheral Component Interconnect Express (PCIe) compliant, and the slot of the interposer is Enterprise and Data Center Standard Form Factor (EDSFF) compliant.

5. The method of claim 4, wherein the slot comprises a type 1C, 2C, 4C, or 4C+ connector.

6. The method of claim 5, wherein the device is at least EDFSS E1 compliant, EDFSS E3 compliant, or Open Compute Project Network Interface Card 3.0 (OCPNIC3.0) compliant.

7. The method of claim 3, wherein reconfiguring the bus comprises:
instructing, by the management controller of the data processing system and using a second bus, the first controller to activate a bypass around the first controller that forwards data between the first point-to-point link and the second point-to-point link;
activating, by the first controller and responsive to being instructed by the management controller, the bypass; and
while the bypass is activated, snooping, by the first controller, the communications.

8. The method of claim 7, wherein the first point-to-point link is Modular Peripheral Sideband Tunnelling Interface (M-PESTI) compliant.

9. The method of claim 8, wherein exchanging the communications between the processor and a second device connected to the interposer using the updated bus comprises:
performing, by a logic device of a host processor module of the data processing system, a second discovery process using the updated bus to identify the second controller; and
responsive to identifying the second controller, obtaining, by the logic device, a second data package from the second controller, the second data package indicating presence of the second device.

10. The method of claim 9, wherein the processor is hosted by the host processor module, the host processor module is directly connected to the riser, and the host processor module is directly connected to a secure control module that hosts the management controller.

11. A non-transitory machine-readable medium having instructions stored therein, which when executed by a processor, cause the processor to perform operations for managing operation of a data processing system, the operations comprising:
identifying an occurrence of an attachment of a device to a riser of the data processing system;
in response to the occurrence:
performing a discovery process for the device to obtain a data package;
making a determination, based on the data package, regarding whether the device is an interposer;
in an instance of the determination where the device is the interposer:
reconfiguring a bus between a processor of the data processing system and the interposer to exclude a first controller of the riser to obtain an updated bus, the updated bus operably connecting the processor and a second controller of the interposer;
exchanging communications between the processor and a second device connected to the interposer using the updated bus; and
providing computer implemented services using the communications.

12. The non-transitory machine-readable medium of claim 11, wherein the processor and the first controller are operably connected via a first point-to-point link and the first controller and second controller are operably connected via a second point-to-point link while the interposer is connected to the interposer using a slot of the riser that conforms to a first standard.

13. The non-transitory machine-readable medium of claim 12, wherein the second device is operably connected to the second controller while the second device is connected to a slot of the interposer that conforms to a second standard, the first standard and the second standard being different standards.

14. The non-transitory machine-readable medium of claim 13, wherein the slot of the riser is Peripheral Component Interconnect Express (PCIe) compliant, and the slot of the interposer is Enterprise and Data Center Standard Form Factor (EDSFF) compliant.

15. The non-transitory machine-readable medium of claim 14, wherein the slot comprises a type 1C, 2C, 4C, or 4C+ connector.

16. The non-transitory machine-readable medium of claim 15, wherein the device is at least EDFSS E1 compliant, EDFSS E3 compliant, or Open Computer Project Network Interface Card 3.0 (OCPNIC3.0) compliant.

17. A data processing system, comprising:
a management controller adapted to:
identify an occurrence of an attachment of a device to a riser of the data processing system,
in response to the occurrence:
perform a discovery process for the device to obtain a data package,
make a determination, based on the data package, regarding whether the device is an interposer, in an instance of the determination where the device is the interposer:
reconfigure a bus between a processor of the data processing system and the interposer to exclude a first controller of the riser to obtain an updated bus, the updated bus operably connecting the processor and a second controller of the interposer; and the processor adapted to:
exchange communications between the processor and a second device connected to the interposer using the updated bus, and
provide computer implemented services using the communications.

18. The data processing system of claim 17, wherein the processor and the first controller are operably connected via a first point-to-point link and the first controller and second controller are operably connected via a second point-to-point link while the interposer is connected to the interposer using a slot of the riser that conforms to a first standard.

19. The data processing system of claim 18, wherein the second device is operably connected to the second controller while the second device is connected to a slot of the interposer that conforms to a second standard, the first standard and the second standard being different standards.

20. The data processing system of claim 19, wherein the slot of the riser is Peripheral Component Interconnect Express (PCIe) compliant, and the slot of the interposer is Enterprise and Data Center Standard Form Factor (EDFSS) compliant.

* * * * *